United States Patent [19]

Chandran et al.

[11] Patent Number: 4,785,453

[45] Date of Patent: Nov. 15, 1988

[54] HIGH LEVEL SELF-CHECKING INTELLIGENT I/O CONTROLLER

[75] Inventors: Strikumar R. Chandran, San Jose; Edward J. Rhodes, Los Gatos; Albert S. Lui; Mark S. Walker, both of San Jose, all of Calif.

[73] Assignee: Tandem Computers Incorporated, Cupertino, Calif.

[21] Appl. No.: 68,732

[22] Filed: Jun. 30, 1987

Related U.S. Application Data

[63] Continuation of Ser. No. 733,679, May 10, 1985, abandoned.

[51] Int. Cl.⁴ .............................................. G06F 11/16
[52] U.S. Cl. ................................................... 371/68
[58] Field of Search .................... 371/68; 364/200, 900

[56] References Cited

U.S. PATENT DOCUMENTS

| | | | |
|---|---|---|---|
| 3,517,174 | 6/1970 | Ossfeldt | 371/68 |
| 3,559,167 | 1/1971 | Carter et al. | 371/63 |
| 3,602,886 | 8/1971 | Carter et al. | 371/63 |
| 3,859,513 | 1/1975 | Chuang et al. | 371/63 X |
| 4,012,717 | 3/1977 | Censier et al. | 371/68 X |
| 4,020,460 | 4/1977 | Jones et al. | 371/68 X |
| 4,070,648 | 1/1978 | Merganthaler et al. | 371/70 |
| 4,096,990 | 6/1978 | Strelow | 371/68 X |
| 4,342,112 | 7/1982 | Stodola | 371/68 |
| 4,358,823 | 11/1982 | McDonald et al. | 371/68 X |
| 4,400,792 | 8/1983 | Strelow | 371/68 X |
| 4,412,280 | 10/1983 | Murphy et al. | 371/68 X |
| 4,541,094 | 9/1985 | Stiffler | 371/68 |
| 4,590,549 | 5/1986 | Burrage et al. | 371/68 X |

Primary Examiner—Charles E. Atkinson
Attorney, Agent, or Firm—Townsend and Townsend

[57] ABSTRACT

The present invention is an input/output controller for providing total data integrity for any single point failure. The I/O controller comprises a processor module having two microprocessors, an associated memory, a direct memory access module ("DMA"), and a processor support module ("PSM"); a device drive interface; and a channel interface. The two microprocessors are operated in lockstep as a dual modular redundant processor system. The processors provide true and complement, respectively, addresses, data and control strobes. The PSM compares the true and complement data to detect errors (i.e., corresponding data bits not being a true-complement pair) and generates parity protected data (and checks parity) on the data bus. The PSM also generates and checks dual railed control strobes and provides synchronization of all control strobes and interrupt signals to enable the tru-complement pair of microprocessors to operate in lockstep. The DMA compares the redundant addresses from the processors to detect errors and to generate parity protected addresses (and check parity) on the address bus. The DMA also generates the checks bus arbitration signals and controls direct memory access. Self-checking checkers are used to check the various dual railed, true-complement pairs of signals to detect, locate and isolate internal faults. Mis-compares between true-complement address, data and control signals and parity errors detected in reading program instructions from memory all are treated as fatal errors, which cause both processors to halt. Other types of errors are treated as nonfatal, which cause processor exceptions during which appropriate programming is executed to locate and isolate such errors.

8 Claims, 6 Drawing Sheets

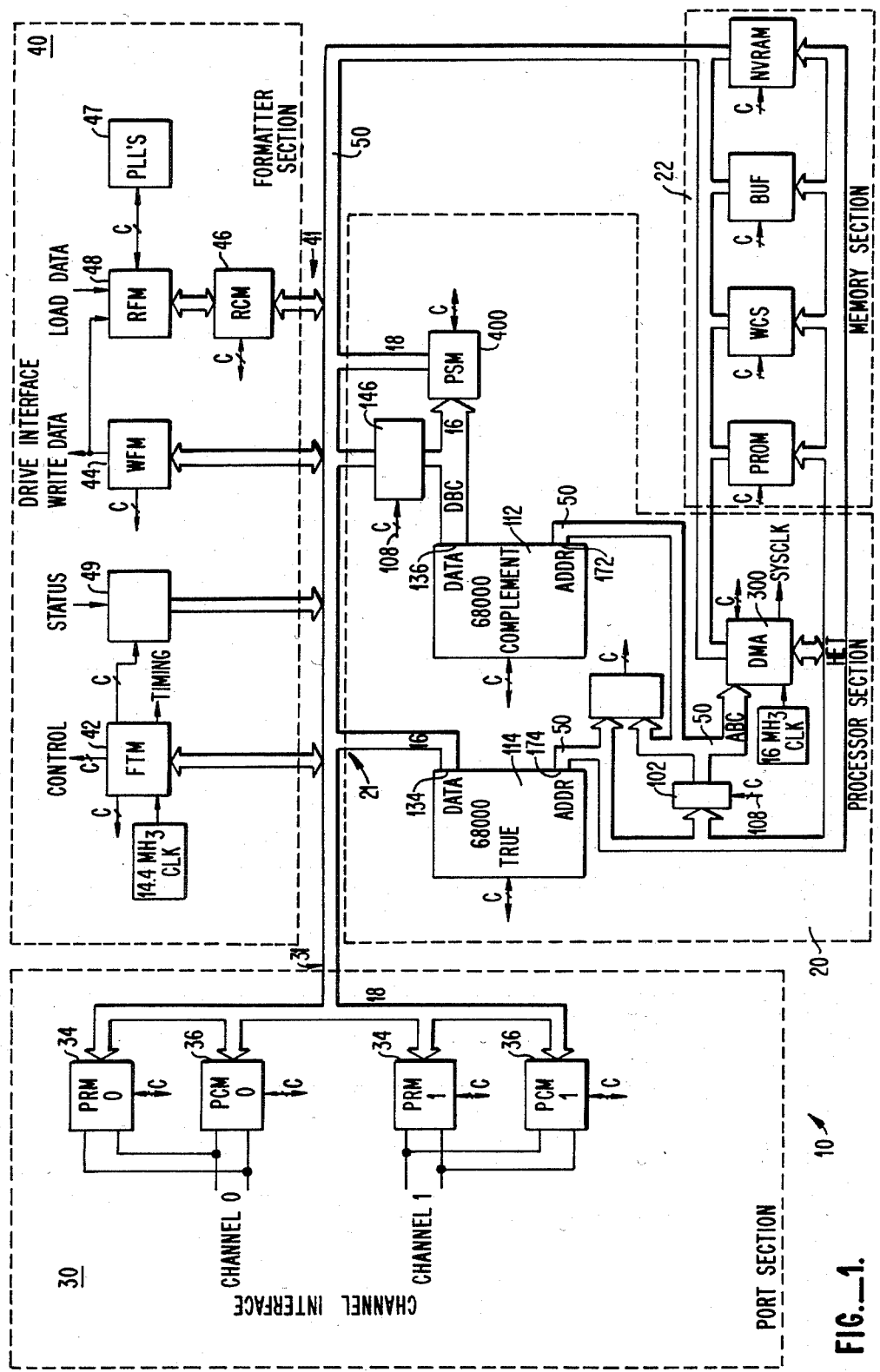
FIG._1.

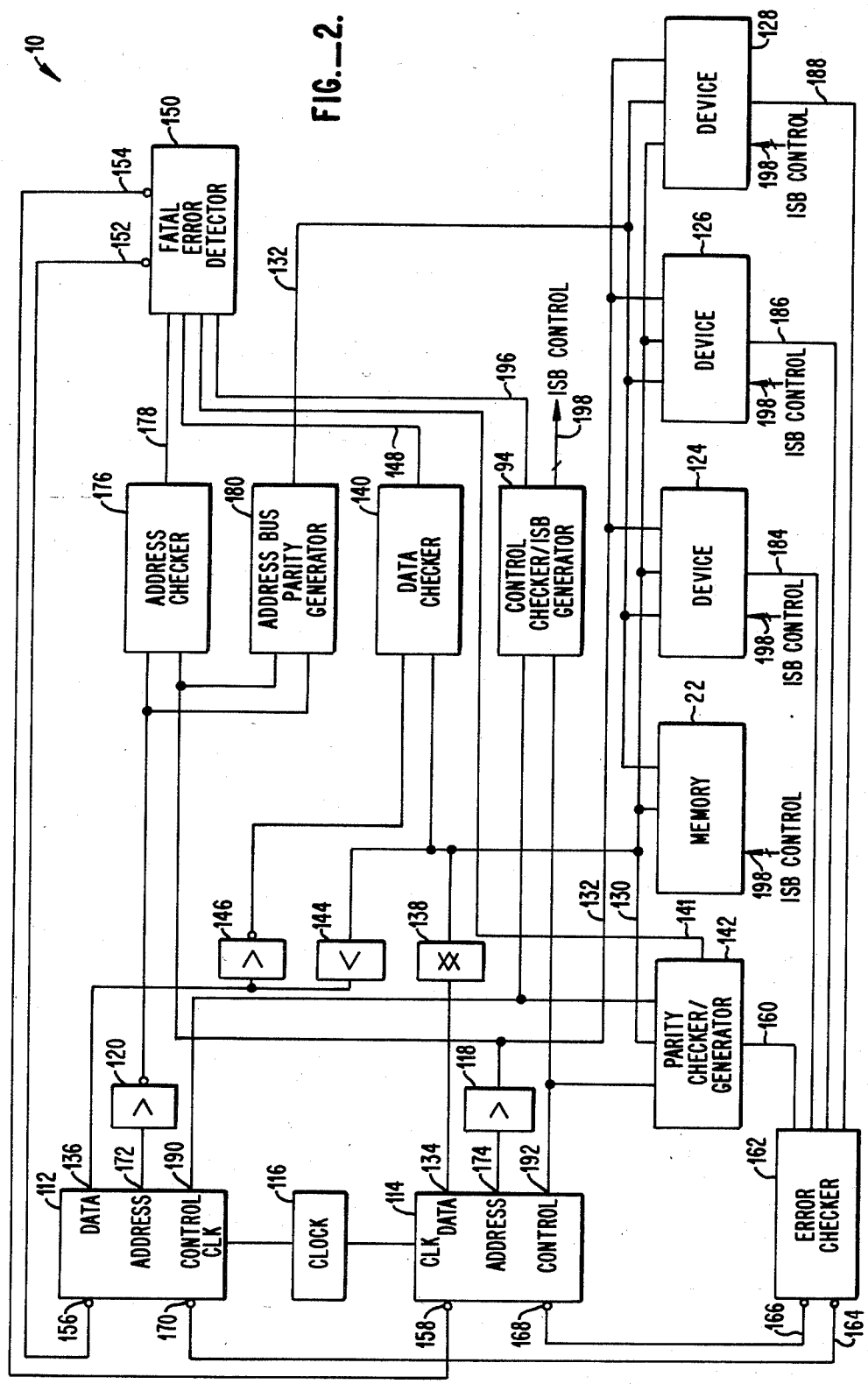
FIG._2.

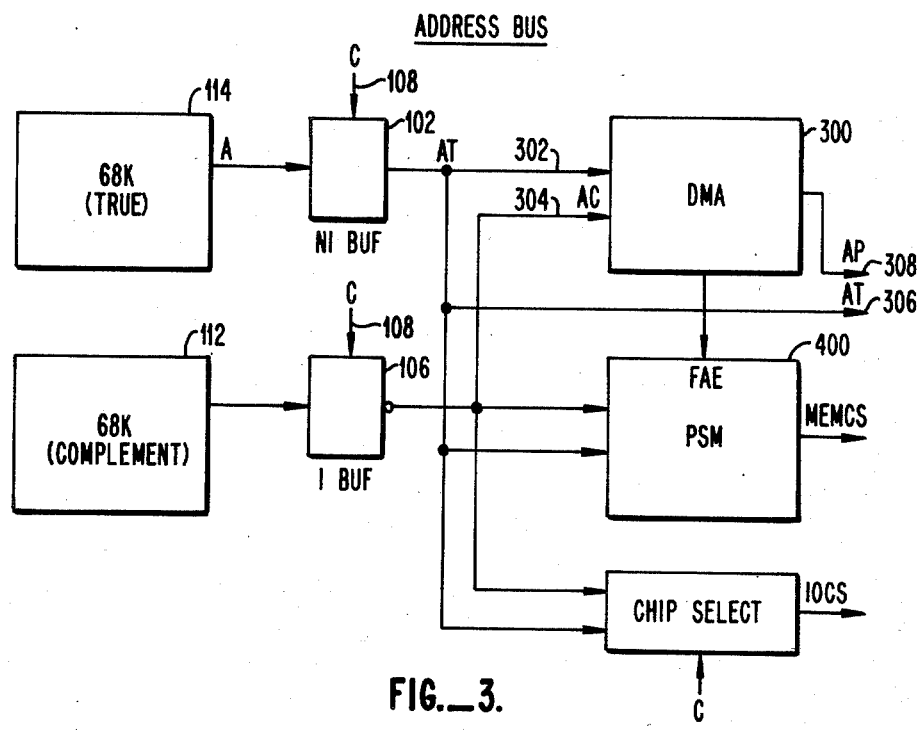
FIG._3.
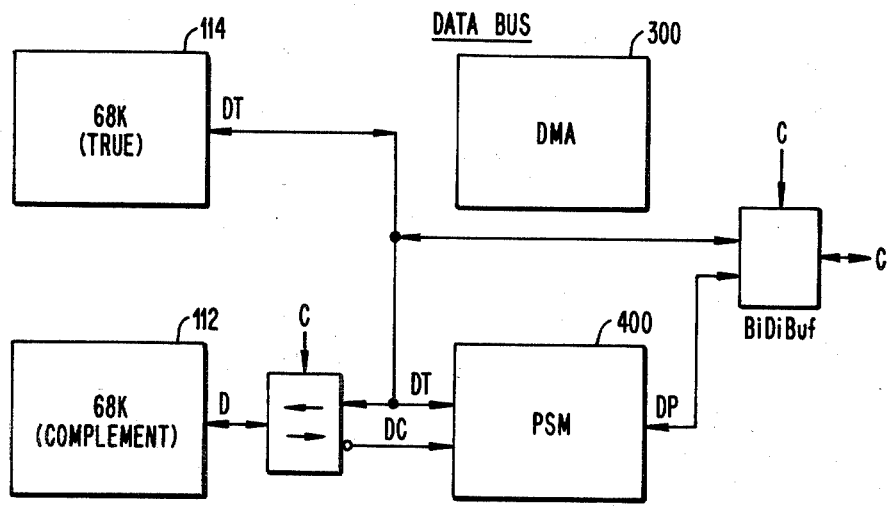
FIG._4.

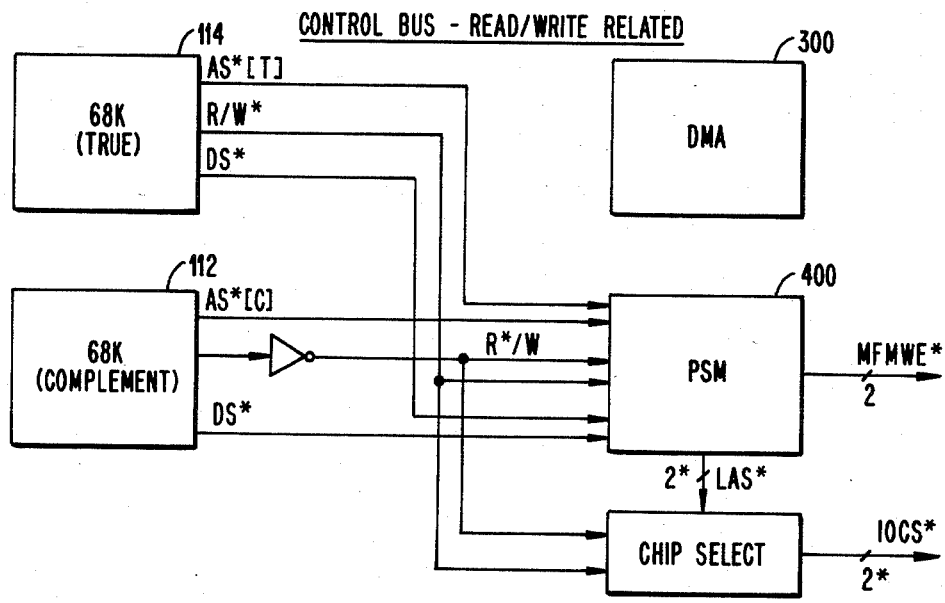
FIG._5.
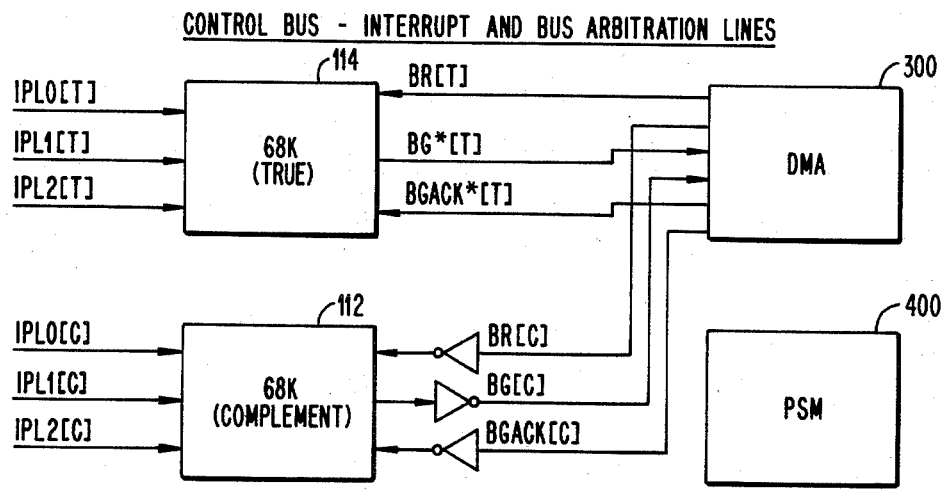
FIG._6.

GENERATION OF LAST ADDRESS STROBE (LAS) (SOLUTION TO THE READ PROBLEM)
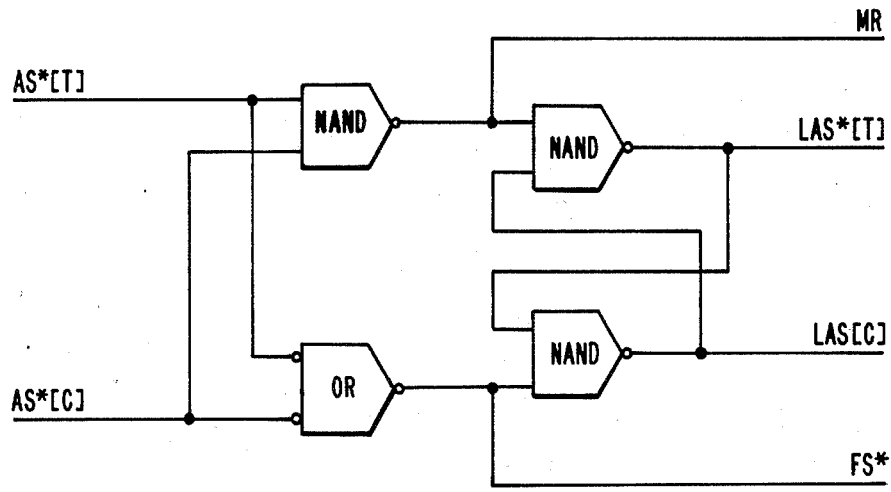
FIG._7A.
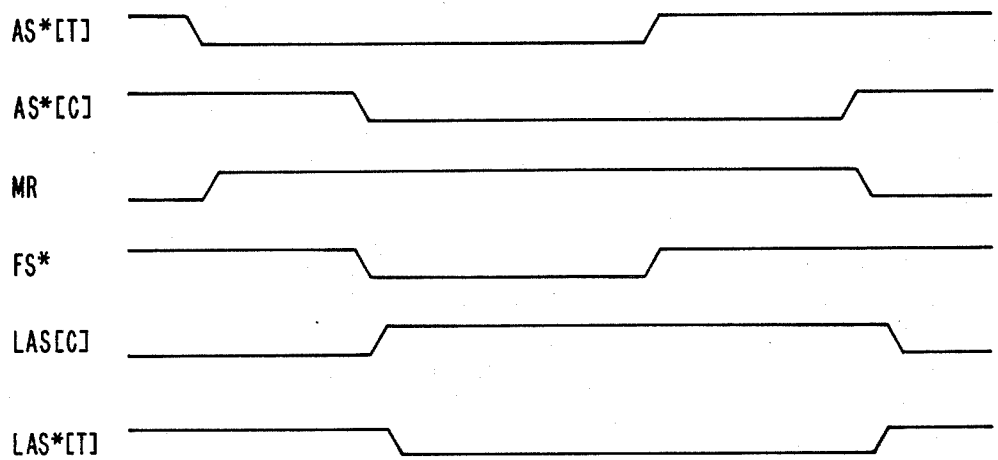
FIG._7B.

GENERATION OF FIRST DATA STROBE (FS) (SOLUTION TO THE WRITE PROBLEM)
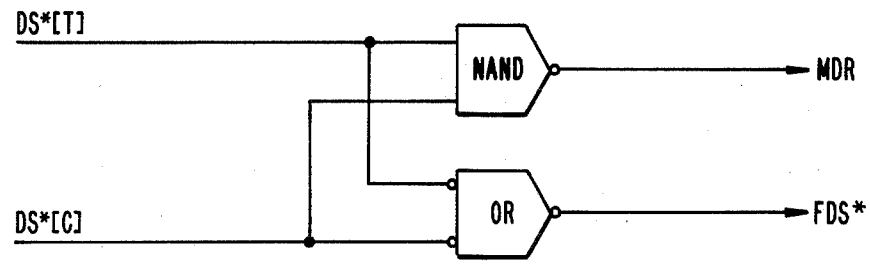
FIG._8A.
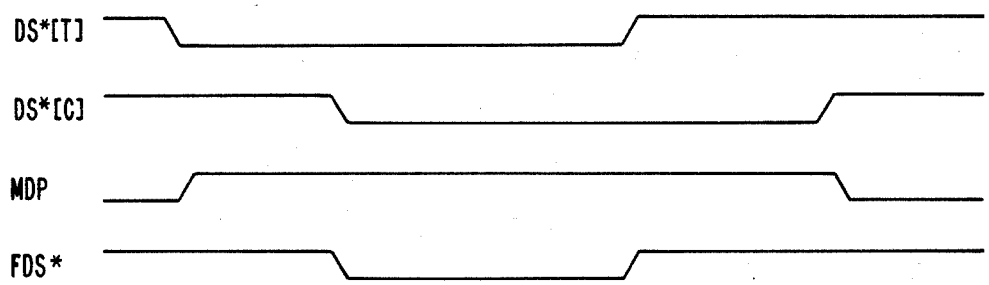
FIG._8B.

HIGH LEVEL SELF-CHECKING INTELLIGENT I/O CONTROLLER

This is a continuation of application Ser. No. 733,679, filed 5/10/85, now abandoned.

BACKGROUND OF THE INVENTION

1. Field of the Invention

The present invention relates to a high level self-checking intelligent input/output ("I/O") controller employing a tightly coupled, dual modular redundant processor system, a direct memory access module and a processor support module. More particularly, the present invention relates to an I/O controller employing a pair of processors operated in lockstep and providing error protected data and address buses and dual railed, true-complement control signals that are checked by self-checking checkers in the form of morphic reduction circuits. The present invention is adapted to provide a high degree of data integrity by detecting, locating and isolating internal faults with respect to both time and geography.

2. Brief Description of the Prior Art

Commercially available, off-the-shelf microprocessors do not protect their address, data and control buses from internal faults. Consequently, such processors by themselves are inadequate for applications where integrity of data and fault tolerance are essential, such as in on-line data processing applications where large volumes of data must be handled at high transaction rates without interruption or contamination of the data within the system in the event a system fault produces an error. Some prior art systems provide error protection for address buses and data buses, but none provide such protection for control buses or lines. Without protection for these control signals certain kinds of failures cannot be detected quickly, permitting errors to propagate through the system and making fault isolation more difficult. Error propagation can lead to corruption of data, which is unacceptable in many applications. Therefore, there was needed in the art a system that could protect against errors in address, data and control signals.

Accordingly, it is a principal object of the present invention to detect, locate and isolate all single point faults and certain classes of multiple point faults, on the address, data and control buses of a dual modular redundant processor system.

It is a further object of the present invention to protect the address bus, data bus and control bus from single-point faults, either static or transient.

It is a further object of the present invention to detect such faults on a bus cycle basis.

It is a further object of the present invention to report any detected faults either on the same bus cycle during which they are detected or on the next cycle.

It is a further object of the present invention to detect, locate, isolate and report internal faults before they can propagate, either in time or geography, thereby rendering fault determination and correction substantially easier and more reliable.

It is a further object of the present invention to operate a redundant pair of commercially available microprocessors in lockstep to provide an internal system bus protected against address, data and control errors and thus ensure a high degree of data integrity.

SUMMARY OF THE INVENTION

The present invention comprises an input/output (I/O) controller architecture employing a pair of commercially available, off-the-shelf microprocessors operated as a tightly coupled, dual modular redundant processor system. The I/O controller of the present invention further comprises: a processor module having two processors, direct memory access module, processor support module, and memory; a device drive interface; and a channel interface.

The processors are driven in lockstep by a common clock to provide redundant (e.g., true and complement) addresses, data and control strobes on an internal system bus (the "ISB"). One of the microprocessors is denominated the "true" processor and the other the "complement" processor. Each processor outputs addresses and data to, and inputs data from, the ISB. The ISB is protected against errors by parity checking and by the morphic reduction of true-complement pairs provided by the redundant processors. The processor module, device drive interface and channel interface in the present invention are protected against errors by overlapping techniques employing parity protected addresses and data, dual railed address, data and control signals, parity predict counters, duplicated state machines and parity predicted state machines.

Each processor outputs on the internal system bus or on control lines five types of control strobes relating to read and write operations: an address strobe ("AS*"); an upper data byte strobe *"UDS*"); a lower data byte strobe ("LDS*"); a data acknowledge strobe ("DTACK*"); and a read/write strobe ("R/W*"). Thus, there is a true-complement pair of control signals (i.e., one signal from each processor) for each control strobe. One difficulty in using redundant control signals from redundant processors to provide error protected control signals is that commercially available, off-the-shelf processors have timing tolerances that permit identical control strobes generated by separate processors to be skewed in time. Therefore, a comparison of the redundant control strobes is not meaningful unless the possibility of timing skews is taken into account. In the present invention, the control strobe signals on the two lines are synchronized to within the timing tolerances of the two processors, and additional synchronizing means are employed to enable the redundant control strobes to be compared throughout the I/O controller 10 of the present invention.

An address bus parity generator generates an odd parity bit for all addresses. An address checker comprising a self-checking checker or morphic reduction circuit checks the true-complement pairs of addresses provided by the two processors and produces an error upon detecting a miscomparison. A data checker performs a similar function with respect to data being read to or written from a common memory shared by the processors. The true-complement control strobes are similarly checked by a control checker. Any miscomparison of control strobes causes a fatal error detector to produce a pair of halt signals, one of which is applied to each of the two processors to cause them to cease processing. The morphic reduction circuits are self-checking such that any fault in such circuits themselves also is detected as an error.

In the present invention, all interrupt signals for the pair of processors are dual railed and are handled independently, but synchronously, by each processor.

Therefore, the only type of error which would result in an address, data or control error is a transient or static fault in the interrupt lines themselves. All single point faults and certain classes of multiple point faults are detected on a bus cycle basis. All errors, except data parity errors, are reported on the same cycle of microcode execution during which the fault occurs; data parity errors are reported on the next cycle. Faults can be located to specific devices (i.e., integrated circuit chips) and reported to the system with a high degree of confidence.

The system of the present invention includes a common memory and additional devices (e.g., circuits used in read/write operations) that are accessed by both processors. Non-fatal errors on the ISB are detected by an error checker and reported to the processors via a dual railed pair of bus error signals (i.e., a true-complement pair of signals). In response to bus error signals, the processors execute firmware from the program space (or code space) in memory to locate the system element in which the fault that caused the error occurred. Fatal errors cause the two processors to halt processing via dual railed halt signals. In the preferred embodiment, only the following types of errors are fatal: miscomparisons between the redundant addresses, data or control strobes and parity errors in the program code space.

The present invention uses three dual railed bus arbitration lines between the DMA module and each of the two processors: bus request; bus grant; and bus grant acknowledge. The bus request and bus grant acknowledge lines carry signals from the DMA module to each of the processors, and the bus grant lines carry signals from the processors to the DMA module.

DESCRIPTION OF THE DRAWINGS

FIG. 1 is a block diagram of the processing, channel interface, device interface, and memory functional blocks of the present invention;

FIG. 2 is a block diagram of the tightly coupled, dual modular redundant computer processor system of the present invention;

FIG. 3 is a block diagram of the address bus of the architecture of the present invention;

FIG. 4 is a block diagram of the data bus of the architecture of the present invention;

FIG. 5 is a block diagram of the read/write lines of the control bus of the architecture of the present invention;

FIG. 6 is a block diagram of the interrupt and bus arbitration lines of the control bus of the architecture of the present invention;

FIG. 7A is a logic diagram of circuitry of the present invention for resolving timing problems for read operations;

FIG. 7B is a timing diagram illustrating the relationship between the two read control strobes and the single control strobe which controls when read operations can occur;

FIG. 8A is a logic diagram of circuitry of the present invention for resolving timing problems for write operations; and FIG. 8B is a timing diagram illustrating the relationship between the two write control strobes and the single control strobe which controls when write operations can occur.

DETAILED DESCRIPTION OF THE PREFERRED EMBODIMENT

With reference to FIG. 1, the I/O controller 10 of the present invention is comprised of three major functional blocks: a processor block 20 and an associated memory 22; a port control or channel interface 30; and a device interface 40. Functional blocks 20, 30 and 40 are interconnected by an internal system bus ("ISB") 50. Processor block 20 includes a true processor 114, a complement processor 112, a direct memory access ("DMA") module 300, and a processor support module ("PSM") 400, as illustrated in FIGS. 1-6. A memory section 22 is communicably connected to processor block 20 via ISB 50. Buffers 108 and 102 are data buffers of a type commonly used in the art.

With reference to FIG. 2, which illustrates in greater detail processor block 20 in FIG. 1, the I/O controller 10 of the present invention includes two commercially available, off-the-shelf microprocessors 112 and 114 (e.g., Motorola type MC 68000 microprocessors) operated in lockstep from a common clock 116 as a tightly coupled, dual modular redundant computer processor system. Processor 114, which has a non-inverting buffer 118 (an electrical buffer for increasing electrical drive capability) on its address bus 174, is denominated the "true" processor, and processor 112, which has an inverting buffer 120 (an electrical buffer) on its address bus 172 and an inverting buffer 146 on its data bus 136, is denominated the "complement" processor. True processor 114 and complement processor 112 share a common program space or code space (not shown), which is parity protected, within a common memory 22. Processors 112 and 114 also commonly access a plurality of devices 124, 126 and 128, which, as illustrated in FIG. 1, can be, for example, a write formatter chip 44, a read formatter chip 48 or DMA 300. Additional or fewer such devices can be employed as necessary or desired without departing from the present invention (see FIG. 5).

ISB 50 includes an address bus portion 132 (see FIG. 3), a data bus portion 130 (see FIG. 4) and a control portion 198 (see FIG. 5). The architecture of the present invention protects all three portions of ISB 50 as well as other control lines (not shown) against errors caused by faults. (Herein the term "error" means an abnormal condition in a set of observable outputs for a given set of input conditions at the time of observation; "fault" means an abnormal condition in a physical element of a logic circuit; "checkability" means the ability to detect faults by observing errors, which requires that every physical fault result in an abnormal set of outputs for some normal set of inputs; and "testability" means the ability to locate faults, and the set of inputs used to locate faults need not be "normal" inputs.) In the preferred embodiment, data bus 130 carries 16 bits of data and two parity bits (i.e., one parity bit for an upper data byte and another parity bit for a lower data byte), and address bus 132 carries eight bits of address and one parity bit. In the preferred embodiment, data bus 130 and address bus 132 are tri-state (i.e., logic 1 and logic 0 states plus an inactive state corresponding to a voltage level within a "dead" zone).

In the present invention, system level errors are divided into two groups: fatal and nonfatal. Fatal errors are catastrophic and cause controller 10 to halt. Nonfatal errors initiate exception processing by processors 112 and 114. The exception processing is controlled by microcode stored in memory 22 that is executed in response to a nonfatal error signal. In certain instances, one or more nonfatal errors may lead to a fatal error, which halts further processing by processors 112 and 114.

Processors 112 and 114 have data ports 136 and 134, respectively. Data port 134 of true processor 114 is connected via a non-inverting buffer 138 (an electrical buffer) to a data checker 140 and a parity checker/generator 142 via data bus 130 of ISB 50. Data port 136 of the complement processor 112 is connected to ISB data bus 130 via a non-inverting buffer 144 (an electrical buffer), which permits data to be passed from ISB data bus 130 to complement processor 112 without being inverted. Data is passed from data port 136 of complement processor 112 to data checker 140 via an inverting buffer 146 (an electrical buffer).

Thus, data checker 140 (which is included in PSM 400) receives a true set of data from true processor 114 (and non-inverting buffer 138) and a complement set of data from complement processor 112 (and inverting buffer 146). Data checker 140 includes morphic reduction circuits (not shown) of a commonly used type, which function as self-checking checkers and which compare the true data and the complement data. The true and complement data buses are checked and reduced in data checker 140 by morphic reduction on every write cycle, which results in one true-compliment signal pair. Any miscompare between the true and complement data (i.e., where a data bit from the complement data bus is not the complement of the corresponding data bit from the true data bus) or any error in the associated self-checking checker circuit itself (not shown) is a fatal error. If a fatal error is detected by data checker 140, an error signal in the form of a true and complement pair is produced by data checker 140 and transmitted via a pair of fatal data error lines 148 to a fatal error detector 150, which is described below. The output of fatal error detector 150 is a pair of fatal error lines 152 and 154, which are connected respectively to the halt inputs 156 and 158 of processors 112 and 114. Thus, when fatal error lines 152 and 154 go active in response to data miscompares or detection of an error in data checker 140, processors 112 and 114 are halted.

Assuming no error is detected by data checker 140, the checked data is used by parity checker/generator 142 to generate an upper and lower data byte and a lower byte even data parity bit and an upper byte even parity bit on data bus 130. In the preferred embodiment, two data parity bits are used to improve data error protection coverage and to allow for operations on either bytes or words of data. As discussed below, all I/O mapped registers check for good data parity while being written into, and any errors are reported back to processors 112 and 114 on the same bus cycle. Parity checker/generator 142 monitors data bus 130 for parity errors during read operations by processors 112 and 114, and any error detected is reported via a true and complement pair of non-fatal error signals on lines 160 to error checker 162, which produces a pair of non-fatal error signals on lines 164 and 166, which are connected to bus error inputs 168 and 170 of processors 112 and 114, respectively. Parity errors detected by parity checker/generator 142 are treated as non-fatal errors, which are processed by processors 112 and 114 executing appropriate firmware (not shown) stored in memory 22 on an exception basis to locate the faulty circuit. Parity checker/generator 142 generates parity bits during write operations.

Thus, byte wide parity is generated and checked on the data bus. In the preferred embodiment, there are four bits of parity control in a parity control register (not shown). These four bits, under microcode control, are used to generate odd parity on the lower or upper byte and disable parity checking on the lower or upper byte. When parity checking is not disabled, even parity is always checked on read operations and even parity is always generated on write operations.

During a read operation even parity is checked. If an error occurs there are two possibilities: (1) the read was from code space, in which case the error is defined as fatal causing the controller to halt; or (2) the read was from data space, in which case a bus error is issued to processors 112 and 114 and exception processing is initiated.

Complement processor 112 has an address port 172 for outputting addresses via inverting buffer 120 to ISB address bus 132, and true processor 114 has an address port 174 for outputting addresses via non-inverting buffer 118 to ISB address bus 132. Due to inverting buffer 120, the complement of each address bit is provided to address checker 176, which is part of DMA 300, from complement processor 112. The true address bits are provided to address checker 176 from true processor 114. Except during the direct memory access operating mode, these two sets of address lines are checked by address checker 176, which comprises self-checking checkers or morphic reduction circuits (not shown) of a type known in the art. If there is a miscompare between any true and complement pair of address bits (i.e., one bit is not the complement of the other), address checker 176 produces a true and complement pair of fatal address error signals on lines 178. Because address checker 176 is self-checking, any fault in address checker 176 itself also produces a true and complement pair of fatal address error signals on lines 178. The fatal address error signals are applied via lines 178 to fatal error detector 150, which responds in the same manner as discussed above with respect to fatal data errors. Thus, if there is an address miscompare or a fault in address checker 176, processors 112 and 114 are halted. All address errors are detected by address checker 176 on the same bus cycle and are treated as fatal errors by fatal error detector 150, causing a halt.

During the normal processor read/write mode, the checked true-complement addresses are used by address bus parity generator 180 to generate odd parity across the address which is then supplied to ISB address bus 132. The true address bits with an odd parity bit constitute the bits carried on ISB address bus 132. In the preferred embodiment, all peripheral circuits, devices 124, 126 and 128, for example, include logic circuitry for checking parity of the address on ISB address bus 132 on every read and write operation when such device is selected and its internal registers addressed. Parity errors detected by devices 124, 126 and 128 are treated as non-fatal errors, and they produce true-complement pairs of non-fatal error signals on line pairs 184, 186 and 188, respectively, which transmit the signals to error checker 162 for handling in the same manner as data parity errors detected by parity checker 142 discussed above. Such errors are processed by processors 112 and 114 executing suitable microcode instructions during the interrupt to locate the faulty circuit.

During the direct memory access operating mode, odd party is generated by an address counter (not shown) in DMA 300. This address parity is checked internal to DMA 300 at the address bus interface buffers (not shown). Any error found during this checking will cause DMA 300 to stop the direct memory access and to relinquish ISB bus 50. In addition, an external address bus parity checker (not shown) can be used to check the parity of the addresses on address bus 132 during direct memory accesses. In the event an error is detected by such external address bus parity checker, the direct memory access is stopped and control of ISB bus 50 relinquished.

Processor 112 has a control strobe output 190 and processor 114 has a control strobe output 192. Processors 112 and 114 each generate at outputs 190 and 192, respectively, the following set of ISB control strobes: an address strobe; an upper data strobe; a lower data strobe; a data acknowledge strobe; and a read/write strobe. These five strobes are used to execute read and write operations. For each of the five strobes, a true strobe is provided by true processor 114 and a complement strobe is provided by complement processor 112 to control checker/ISB generator 194. The true-complement pairs of control strobes received by checker/ISB generator 194 are in synchronism within the timing tolerances of processors 112 and 114. As described below, the control strobes are further synchronized by control checker/ISB generator 194, which comprises part of PSM 400. The five signals on control lines 190 and 192 are compared by self-checking checkers (i.e., morphic reduction circuits) in control checker/ISB generator 194, and any miscomparison (i.e., detection of corresponding strobe signals from processors 112 and 114 that are not a true-complement pair) is treated as a fatal error. Upon detecting a miscomparison, control checker/ISB generator 194 produces a true-complement pair of fatal error signals, which are applied via a pair of lines 196 to fatal error detector 150. Fatal error detector 150 handles the fatal error signals in the manner described above with respect to address checker 176 and data checker 140.

This checking of the control strobes independently of all data and address checking achieves two important design goals: (1) isolation of errors to control bus 190 or 192, thus making it easier to troubleshoot; and (2) prevention of error propagation, thus saving the context under which the error occurred, which is especially important in locating transient and intermittent error conditions.

There are some design challenges in checking the control strobes. Even though processors 112 and 114 both are drive by common clock 116, one of the processors might be operating at its minimum delay specification and the other might be operating at its maximum delay specification due to process variations in fabricating the parts. Therefore, even though the two processors 112 and 114 have identical specifications and run off a common clock signal, their output signals may be skewed in time with respect to one another. The effect of this in data reads and writes is to create more stringent setup and hold margins. Due to the possible skew of lock-stepped processors 112 and 114, the address and data strobes, for example, must be synchronized such that, for a read, the data is held on data bus 130 until the slower processor has read the data (i.e., the last strobe goes away), and for a write, the data is written when the fastest processor's write strobe has gone inactive (i.e., the first strobe goes away). To accomplish the foregoing, the independent addresses are latched at processors 112 and 114 and held until the last of the two data strobes goes away. These latched address buses are used to chip select and access data; thus, the data is held long enough for both processors 112 and 114 to read the same data. The write strobes for memory 22 are issued on the first data strobe. Again the address and chip selects are held until the last data strobe goes away, thus the address will be valid and the hold time satisfied for memory writes.

The timing diagram in FIG. 7B for read operations shows the true-complement pair of address strobes AS*[T] and AS*[C] and the read signal LAS*[T]. Read operations can occur while LAS*[T] is active, which is the case when the slower of the address strobes (in this case AS*[C]) is active. Similarly, the timing diagram in FIG. 8B for write operations shows the true-complement pair of data strobes DS*[T] and DS*[C]. Write operations can occur while the signal FDS* is active (i.e., low) which is the case only while both data strobes are active.

Therefore, in the present invention modified strobes are generated by control checker/ISB generator 194 to take care of the stringent timing requirements for read and write operations. This generation itself is done in a self-checking manner and is dual railed. A synchronizer circuit suitable for attaining the necessary synchronization is described in the co-pending U.S. patent application entitled "Self-Checking Dual Railed Leading Edge Synchronizer," Ser. No. 733,293, filed May 10, 1985, and assigned to the same assignee as the present application.

All peripheral circuits (e.g., devices 124, 126 and 128) interfacing to these modified control strobes via line 198 from control checker/ISB generator 194 are designed such that they check these lines on every read for non-fatal exception processing, as discussed above.

Parity protection also is provided by parity checker/generator 142 for the data space in common memory 22. If parity checker 142 detects a parity error during a fetch of operating code from memory 22, parity checker 142 produces a true-complement pair of fatal error signals on a pair of lines 141, which applies the fatal error signals to fatal error detector 150 for handling in the manner discussed above. If parity checker 142 detects a parity error during a read operation from memory 22, a true-complement pair of non-fatal error signals is produced by parity checker 142 on line pair 160 and applied to error checker 162, which handles such non-fatal errors in the manner discussed above.

With reference to FIG. 1, channel interface 30 consists of logic for dual channel ports 32A and 32B. Channel interface 30 receives and interprets commands from the central processing unit (not shown), and performs data transfers between I/O controller 10 and the cpu via ports 32A and 32B.

Device interface 40 consists of interface control and formatter circuits (e.g., write formatter module 44, formatter timing module 42, read control module 46 and read formatter module 48), which in the preferred embodiment interface between ISB bus 50 and two tape drives (not shown). While device interface 40 is unique in order to interface with ISB 50, the interface control and formatter circuits are of the kind commonly used in the art for such functions.

To summarize, in the preferred embodiment of the present invention there are four types of fatal errors.

First, the true and complement address buses are checked and morphically reduced by address checker 176 in DMA 300 to produce a single true-complement signal pair that is applied to fatal error detector 150 via lines 178. Second, the true and complement data buses are checked and morphically reduced by data checker 140 in PSM 400 on every write cycle to produce a true-complement signal pair that is applied to fatal error detector 150 via lines 148. Third, the control strobes are cheked and morphically reduced by control checker 194 in PSM 400 to one true-complement signal pair that is applied to fatal error detector 150 via lines 196. The fourth type of fatal errors are code space parity errors that are detected by parity checker 142 and morphically reduced to one true-complement signal pair that is applied to fatal error detector 150 via lines 141.

These fatal errors are latched and checked on every clock cycle. These error signals could indicate an error has occurred for one clock period when in fact there was no error, but only the result of logic delays and processor timing skews. Consequently, in the preferred embodiment a fatal error must be active for two complete clock periods to be considered a real error. This is satisfactory because each fatal error indicator is in a specific state for at least two clock periods.

The result of the fatal error reduction, checking, and sychronizing is two signals: DIEUDOG 152 and DIEUDOG* 154. If either or both of these signals go active, it is left to external logic (not shown) to decide what to do in response to this error condition. In the preferred embodiment, fatal error detector 150 in PCM 400 issues independent halt signals to each of processors 112 and 114.

With respect to nonfatal errors, at the end of each read operation each device 124, 126 and 128 checks ISB 50 for parity errors when it is being accessed, and parity checker/generator 142 checks parity when memory 22 is being accessed, by processors 112 and 114. The result of this check is latched (in true-complement form) and reported through one true-complement signal pair called ERR on lines 184, 186, 188 and 160, respectively. Error checker 162 in PSM 400 receives ERR signal pairs and, using morphic reduction, reduces these to one signal pair. Finally, this pair is XOR'ed to check for a fault. If a fault is detected, two independent bus error signals are generated on lines 164 and 166, for each processor 112 and 114, respectively.

When a bus error is detected by processors 112 and 114, the current bus cycle being executed is aborted, the address and data are pushed on the stack, and exception processing by processors 112 and 114 begins after they jump to a specified location in the program stored in memory 22. The program is formulated to try to locate the fault that caused the error signal. A bus error caused by a device access error is reported during the bus cycle that caused the error. Thus, because the addresses are device specific, the device in error can be determined by reading the pushed address. The address is presumed correct because it has already been checked between processors 112 and 114, and any address error would have been a fatal error. A data parity error is reported on the bus cycle immediately following the bus cycle that caused the error.

In the preferred embodiment, the cause of the bus error (parity or device error) can be determined by reading an error cause ("EC") register (not shown) in PSM 400. Predetermined bits in the EC register are set to indicate detection of (1) a parity error on the upper or lower data byte during a read from data space, (2) a device error during device access, or (3) an error during an operation by DMA 300. If a bus error is generated by detection of a parity error during a device access, PSM 400 will mask the bus error for the next bus cycle. This guards against getting a double bus error due to a signal fault. By checking addresses, data and control strobes on a cycle basis, transient errors can be detected.

In the present invention, the halt signals produced on lines 178, 148, 141, 196, 152 and 154 and the error signals produced on lines 160, 184, 186, 188, 164, and 166 are synchronized by synchronizer means included either in the device in which the error or halt signal originates or in PSM 400 (as described above) in order to ensure that processors 112 and 114 operate in lockstep. The halt and error signals cause respectively different types of interrupts of processors 112 and 114 (see FIG. 6, which illustrates three types of interrupts).

With reference to FIGS. 3 and 6, DMA 300 handles block transfers of data between peripheral modules such as channel interface 30 and device interface 40 (which interfaces, for example, with devices 124, 126 and 128) and memory 22. DMA 300 has four sets of handshake lines (four ports with six lines for each port; not shown), out of which in the preferred embodiment two sets of handshake lines are dedicated to channel port transfers to and from a processor system (such system could be, for example, one of Tandem Computer Incorporated's non-stop line of computers, which are described in U.S. Pat. No. 4,228,496 issued to Katzman et al. and assigned to Tandem Computers Incorporated), and two sets of handshake lines are dedicated to device transfers. In the preferred embodiment no two of the four handshake ports are allowed to be simultaneously active.

With reference to FIG. 6, the present invention uses three bus arbitration lines (which in the preferred embodiment are independent of ISB bus 50) between DMA 300 and each of processors 112 and 114: bus request; bus grant; and bus grant acknowledge. (Thus, each set of handshake lines requires six lines.) The bus request and bus grant acknowledge lines carry signals generated by DMA 300, and the bus grant lines carry signals generated by processors 112 and 114. As shown in FIG. 6, DMA 300 generates dual railed bus request and bus grant acknowledge signals and provides them independently to each of processors 112 and 114. Dual railed bus grant signals are generated by each of processors 112 and 114 and are checked (to see that the signals from processors 112 and 114 constitute a true-complement pair) by DMA 300. The bus request and bus grant acknowledge signals are synchronous with the processor clock (not shown).

The controller state machine (not shown) of DMA 300 is duplicated in DMA 300, and the outputs of each state machine are checked to be sure they agree on every state machine clock cycle. Address generation by DMA 300 is protected by parity predicted binary counters. Any error detected in any of the above logic is logged into an internal error register in DMA 300 (not shown). Detection of any error forces DMA 300 to an error state, which causes DMA 300 to relinquish control over ISB 50. Processors 112 and 114 then resume control over ISB 50 and check the internal error register to determine whether any error occurred during the direct memory access by DMA 300. If any error was logged into the internal register, processors 112 and 114 execute appropriate microcode to locate and isolate the error.

During direct memory access by DMA 300, the data bus portion of ISB 50 is monitored by an independent parity checking circuit (i.e., in the device that is the source of the data or in the device accessing the data—for example, memory 22, or devices 124, 126 and 128 in FIG. 2), and any error is logged into an internal parity status register (not shown) in PSM 400. After a direct memory access operation, processors 112 and 114 read the status of the internal error register in DMA 300 and the parity status register in PSM 400 to see if the direct memory access was completed normally. This helps isolate any fault quickly to minimize the contamination of data. Stuck-at input DMA handshake lines (see FIG. 6) are handled using a time-out mechanism by which control of ISB 50 is forced back to processors 112 and 114, as discussed below.

The timeout mechanism uses a 16 bit counter, (a "watchdog" counter; not shown) in PSM 400. This counter has a separate clock input and an output which goes active whenever an overflow occurs on the count or an error is detected in the parity predict circuitry (not shown). The counter is implemented using a 16 bit linear feedback shift register (pseudorandom sequence generator) with zero suppression. Overflow occurs on the 2**16−1 count. This counter is soft startable. When a GOWD bit is off (zero) the counter is held in reset, when the GOWD bit is set (one) the counter begins counting. Whenever a write is made to the watchdog register, the watchdog counter is reset. This allows the watchdog counter to be reset and started in one operation. If the count reaches a predetermined value before DMA 300 returns control of ISB 50 to processors 112 and 114, an error signal is generated for DMA 300 and control of ISB 50 automatically reverts to processors 112 and 114.

For direct memory access transfers between channel interface 30 and memory 22, additional protection is provided by handshake interlock checking. If any handshake interlock error is detected by channel interface 30, it inactivates its DMA 300 request line (not shown), which permits DMA 300 to relinquish ISB 50.

In the preferred embodiment DMA controller 300 manages 16 K×n bits of RAM via a FIFO scheme, but other schemes are also acceptable. Interleaved transfers (between channel and device) may be possible by using two controllers of the present invention and dual ancillary circuitry.

This architecture lends itself to both cycle-steal mode and burst mode of data transfers. DMA 300 can be configured for the cycle-steal mode of operation for device transfers by connecting the DMA 300 request line (not shown) and DMA 300 control strobe line (not shown) together.

While the preferred embodiment of the present invention has been illustrated and described, it is to be understood that the invention is not limited to the precise construction herein disclosed, and the right is reserved to all changes and modification coming within the scope of the invention as defined in the appended claims.

What is claimed is:

1. A dual modular redundant processor apparatus for assuring data integrity, said apparatus comprising:
   first and second processor means for respectively producing true and complement operating signals in the absence of any abnormal condition in the dual modular redundant processor apparatus;
   internal system bus means coupled to the first and second processor means for comunicating the operating signals;
   means for producing a periodic clock signal;
   synchronizer means coupled to the internal system bus means for synchronizing leading edges of true and complement pairs of the operating signals produced by said first and second processor means, the synchronizer means including means responsive to the periodic clock signal for cyclically sampling the true and complement pairs of the operating signals, and output means coupled to the sampling means and responsive to the clock signal for producing synchronized operating signals having synchronized leading edges and corresponding to the true and complement pairs of the operating signals;
   checker means responsive to the synchronized operating signals for determining whether complementation exists therebetween, said checker means generating a dual-railed error signal in the event of absence of such complementation; and
   error detector means for receiving the error signals from said checker means, said error detector means generating and transmitting to each of said first and second processor means an error detected signal, whereby said first and second processor means can take appropriate action in response to the true and complement operating signals being detected as not having the predetermined logical relationship.

2. The apparatus as claimed in claim 1 wherein the true and complement operating signals respectively include true and complement address signals, said checker means being operable to determine whether the true and complement address signals have a complemented relationship to each other.

3. The apparatus as claimed in claim 2 wherein the true and complement operating signals respectively further include true and complement data signals, said checker means being operable to determine whether the true and complement data signals have a complement of relationship to each other.

4. The apparatus as claimed in claim 2 further comprising:
   parity checker means for checking the parity of each of the true and complement addresses.

5. A self-checking intelligent input/output controller, comprising:
   dual redundant processor means configured to respectively issue true and complement operating signals and a true and complement pair of control signals;
   synchronizer means operable to receive and synchronize the leading edges of the true and complement pair of control signals, the synchronizing means including first circuit means for periodically sampling each one of the true and complement pair of control signals, and second circuit means for comparing the sampled pair of true and complement pair of control signals to produce therefrom true and complement output signals having synchronized leading edges when the leading edges of the true and complement pair of control signals occur within a predetermined time period;
   checker means having morphic reduction circuits coupled to receive and compare the true operating and output signals with the complement operating and output signals to produce a true and complement error signal indicative of a miscompare; and circuit means, including the dual redundant processors, operable in a predetermined manner in response to the error signals.

6. The self-checking intelligent input/output controller of claim 5, wherein the operating signals include address and data signals.

7. The self-checking intelligent input/output controller of claim 6, wherein the circuit means includes means for halting operating of at least one of the dual redundant processors in response to the true and complement error signal.

8. The self-checking intelligent input/output controller of claim 5, including memory means and bus means coupling the dual redundant processor means to the memory means for communicating certain of the operating signals therebetween, the true and complement operating signals respectively including true and complement address signals operable to cyclicly access the memory means, the checker means being operable each memory cycle to receive and compare the true and complement address signals.

* * * * *